United States Patent Office 3,165,538
Patented Jan. 12, 1965

3,165,538
CYCLOUNDECANE-1,2-DICARBOXYLIC ACIDS
Pierre Lafont, Lyon, and Yannik Bonnet, Tassin la Demi-Lune, France, assignors to Rhone Poulenc S.A., a French body corporate
No Drawing. Filed Oct. 24, 1961, Ser. No. 147,204
Claims priority, application France Oct. 27, 1960
9 Claims. (Cl. 260—346.3)

This invention relates to the isomeric cycloundecane-1,2-dicarboxylic acids and to a process for their preparation.

It is known that, by the action of alcoholic solutions of alkali hydroxides or of alkali alcoholates of alpha-halogenated cycloaliphatic ketones, cyclic carboxylic acids are obtained whose ring contains one carbon atom less than the ring of the statring material (Faworswi, Journal Soc. Phys. Chim. Russe 46, 1097 (1914)). The yields in these cases only exceptionally exceed 50%.

However, this type of reaction has not previously been described in the case where there is used as starting material one of the cyclanic ketones of the formulae:

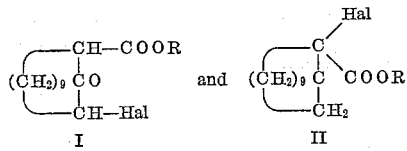

in which R represents a hydrogen atom or an alkyl radical containing from 1 to 5 carbon atoms and Hal represents a halogen atom, preferably chlorine or bromine.

According to the present invention there are provided as new compounds the isomeric cycloundecane-1,2-dicarboxylic acids and the method of their preparation which comprises reacting an alkali metal hydroxide or alkali metal alcoholate with a compound conforming to one of foregoing Formulae I and II and acidifying the reaction mixture to liberate the free acid product, the said reaction being effected (a) when R is a hydrogen atom, with the said hydroxide in aqueous solution and (b) when R is an alkyl radical, either with the said hydroxide in alcoholic or aqueous-organic solution, or with the said alcoholate in alcoholic solution followed by saponification of the resultant diester with an alcoholic solution of an alkali metal hydroxide.

This reaction is surprising because it was to be expected that alkyl 1-halo(or 3-halo)-2-oxocyclododecanecarboxylates, which are halogenated beta-keto-esters, would react with the aforesaid alkali metal derivatives in a similar manner to halogenated aliphatic beta-keto-esters in general. It is known that gamma-chlorinated (or brominated) ethyl acetylacetate gives ethyl cyclohexane-2,5-dione-1,4-dicarboxylate (Beilstein, H., vol. 3, p. 665 and supplement II, vol. 3, p. 426), that alpha-chlorinated ethyl alpha-ethylacetoacetate gives ethyl alpha-ethyle-alpha-ethoxyacetoacetate, and that gamma-brominated ethyl alpha-ethylacetoacetate gives a ketolactone, alpha-ethyl-tetronic acid (Beilstein, H., vol. 3, p. 694).

For carying out the process of the invention, the preferred alkali metal hydroxides are sodium hydroxide and potassium hydroxide. Suitable alcoholic solvents are methanol and ethanol and suitable aqueous organic mixtures are mixtures of water with, for example, methanol, ethanol, or dioxan. When alcoholic solutions of alkali metal alcoholates are used, the vicinal diesters are obtained which are subsequently saponified.

The reaction may be carried out at a temperature from about 20° C. to the reflux temperature of the reaction mixture. The mixture obtained is then treated with a strong acid such as hydrochloric acid, sulphuric acid or acetic acid to adjust the pH to at most 5. Extraction of the mixture with an organic solvent such as diethyl ether or benzene gives a mixture of isomeric cis- and trans-diacids or diesters, from which the constituents may be separated by fractional crystallisation, distillation or any other appropriate method.

By carrying out the above process there can be prepared cis-cycloundecane-1,2-dicarboxylic acid M.P. 171–172° C., the corresponding anhydride of which melts at 67° C., and trans-cycloundecane-1,2-dicarboxylic acid M.P. 196–197° C., the corresponding anhydride of which melts at 72° C.

These isomeric acids can be esterified by known methods with aliphatic or aromatic alcohols to give products of high boiling point, which can be used as plasticisers for vinyl polymers or cellulose plastic. In addition, they can be condensed with aliphatic or aromatic dialcohols to obtain resinous polyesters.

The starting materials of Formulae I and II are readily obtained by the action of solid carbon doxide or an alkyl carbonate, e.g. ethyl carbonate, on the sodium salt of cyclododecanone, followed by halogenation by the direct action of a halogen, e.g. bromine or chlorine. The halogenation is carried out at room temperature in a solvent which is inert to the halogen, such as benzene, diethyl ether, chloroform or carbon tetrachloride, and using only the quantity of halogen which is theoretically necessary. The product obtained is a mixture of the 1- and 3-halo derivatives of 2-oxocyclododecane-carboxylic acid or of its corresponding esters. The derivative halogenated in 3-position emanates from the transposition of the derivative halogenated in 1-position under the action of the hydracid formed in the reaction. Its proportion is higher as the period and temperature of contact with the hydracid are greater. If desired, the isomeric halogenated derivatives thus formed can be separated by subjecting the mixture to the conventional treatments, more especially fractional crystallisation. Such a separation, however, is unnecessary for the preparation of the vicinal cycloundecane-dicarboxylic acids according to the invention, since the two halogenated isomers lead to the same diacids.

The following examples illustrate the invention.

EXAMPLE I (a) *Preparation of Ethyl 2-Oxocyclododecanecarboxylate*

Into a three-litre spherical flask provided with a condenser, a supply funnel and a stirrer are introduced 100 g. of sodamide and 500 cc. of anhydrous diethyl ether, then a solution of 364 g. (2 moles) of cyclododecanone in 650 cc. of ether is run in with stirring over 2 hours. The mixture is then heated for 2½ hours, the heating is stopped and 472 g. of ethyl carbonate is run in over 1 hour. The mixture is heated under reflux for 2 hours with stirring and left overnight in the cold, the stirring being maintained. The compact mass obtained is hydrolysed by a mixture of 100 cc. of glacial acetic acid and about 300 g. of crushed ice. After extraction with ether, the ethereal fraction is washed with a 20% aqueous sodium bicarbonate solution and then twice with water. After drying over anhydrous sodium sulphate, the ether is distilled under normal pressure and the excess of ethyl carbonate is distilled in vacuo (42–45° C. under 30 mm. Hg). There thus remain 499 g. of a product which is distilled in a high vacuum, a middle fraction being obtained which consists of 420 g. of ethyl 2-oxocyclododecanecarboxylate, B.P. 125–126° C. under 0.2 mm. Hg.

(b) *Preparation of Ethyl 1-Bromo-2-Oxocyclododecanecarboxylate, and of Ethyl 2-Oxo-3-Bromocyclododecanecarboxylate*

Into the same apparatus as used in (a) above are introduced 254 g. of ethyl 2-oxocyclododecanecarboxylate and 1000 cc. of chloroform, then about 52 cc. of bromine is run in drop-by-drop over 30 minutes and the mixture is stirred for one hour at a temperature of 20–22° C. The product is then washed with water and the chloroformic layer is then dried over anhydrous calcium chloride. After distillation of the chloroform in vacuo, there is obtained 333 g. of a thick reddish oil which partially crystallises on cooling. By melting this mass and then recrystallising it from petroleum ether, B.P. 30–50° C., there is obtained 223.5 g. of a solid having a melting point of 94° C. which, in infra-red spectroscopy, does not show any of the characteristic bands of the enolic form of beta-keto-esters which are visible, for example, on ethyl 2-oxo-cyclododecanecarboxylate. It is therefore considered to be ethyl 1-bromo-2-oxocyclododecanecarboxylate, obtained in a yield of 67% in relation to the initial beta-keto-ester, and of which analysis gave the following results:

|  | Calculated | Found |
|---|---|---|
| C, percent | 54.06 | 54.10 |
| H, percent | 7.56 | 8.04 |
| Br, percent | 23.98 | 24.41 |

There can be recovered from the mother solution by evaporation 109 g. of a thick oil which does not crystallise, even after several days at a temperature of 0° C., and which is undistillable, this oil being characterised as ethyl 2-oxo-3-bromocyclododecanecarboxylate. In particular, in infra-red spectroscopy, this new product shows characteristic bands of the enolic form with an intensity greater than those shown by the initial 2-oxocyclododecanecarboxylate. Its analysis gave the following results:

|  | Calculated | Found |
|---|---|---|
| C, percent | 54.06 | 54.20 |
| H, percent | 7.56 | 7.95 |
| Br, percent | 23.98 | 23.87 |

In addition, it gives a violet coloration with ferric chloride, while the isomer brominated in the 1-position gives no coloration.

*(c) Action of an Alkali Metal Hydroxide in Ethanolic Medium on Ethyl 1-Bromo-2-Oxocyclododecanecarboxylate*

A solution of 22 g. of potassium hydroxide in 180 cc. of ethanol is introduced into the same apparatus as used in (a) above and, while the temperature is maintained at 20–22° C., there is run in drop-by-drop over half an hour a solution of 33.3 g. of ethyl 1-bromo-2-oxocyclododecanecarboxylate in 80 cc. of ethanol. Stirring is then maintained for 3 hours at 20–22° C., and the ethanol is then distilled under reduced pressure and the eliminated alcohol is replaced by water. After extraction with ether, the aqueous solution is acidified by the addition of 2 cc. of concentrated hydrochloric acid and then extracted with benzene. After elimination of the solvent of the benzene solution, 23.11 g. of acid product is collected. 200 cc. of ether are added and the mixture is brought to boiling point with stirring. A precipitate is deposited, which is filtered and dried. There is thus obtained 9.865 g. of solid product which, when recrystallised from methanol, melts at 196–197° C., acid concentration 99.5%, and of which analysis gave the following results:

|  | Calculated for $C_{13}H_{22}O_4$ | Found |
|---|---|---|
| C, percent | 64.44 | 64.40 |
| H, percent | 9.15 | 9.18 |

This product is the trans form of cycloundecane-1,2-dicarboxylic acid.

The filtrate is then evaporated and there remains 12.9 g. of a viscous oil which, on distillation under 0.1 mm. Hg, gives a middle fraction (B.P.: 130–132° C. under 0.1 mm. Hg) representing 8.09 g. which, on recrystallisation from ether gives 4.4 g. of shiny crystals, M.P. 65–67° C., identified as the anhydride of the cis form of cycloundecane-1,2-dicarboxylic acid, which is an isomer of the trans form.

Analysis form:

|  | Calculated for $C_{13}H_{20}O_3$ | Found |
|---|---|---|
| C, percent | 69.61 | 69.32 |
| H, percent | 8.99 | 8.84 |

It is possible to convert the anhydride of the cis acid into the corresponding cis diacid. For this purpose, there are introduced into a 250 cc. spherical flask 1.2 g. of the anhydride obtained above and a solution of 0.8 g. of sodium hydroxide in 100 cc. of water. The mixture is heated at 80–90° C. with stirring for about three-quarters of an hour, allowed to stand overnight and acidified with 1 cc. of 10% dilute hydrochloric acid. A dense precipitate is deposited, which is filtered, washed with water and dried. There is thus obtained 1.18 g. of a crystalline product which melts at 169–170° C. and which, on recrystallisation from methyl ethyl ketone, melts at 171–172° C. The cis-cycloundecane-1,2-dicarboxylic acid thus prepared has an acid concentration of 100% and its analysis gives the following results:

|  | Calculated for $C_{13}H_{11}O_4$ | Found |
|---|---|---|
| C, percent | 64.44 | 64.72 |
| H, percent | 9.15 | 9.35 |

It is also possible to convert the anhydride of the cis acid into the trans diacid. For this purpose, there is introduced into a 250 cc. spherical flask provided with a condenser, a supply funnel and a stirrer a solution of 1.6 g. of sodium hydroxide in pellet form in 80 cc. of ethylene glycol, which is then heated to 190° C. with agitation and then 2.4 g. of the anhydride of the cis acid (prepared as described above) is dropped in in small portions. Heating is maintained at 190° C. with stirring for a further three-quarters of an hour. The mixture is then allowed to cool to ambient temperature and the glycol is distilled in vacuo and replaced by water. The product is acidified with a few cc. of hydrochloric acid diluted to 10%. The precipitate formed is filtered and then dried in an oven in vacuo. There is thus obtained 0.519 g. of a crystalline product, M.P. 196–197° C., consisting of trans-cycloundecane-1,2-dicarboxylic acid, whose characteristics are identical with those given above.

In order to effect the conversion of the trans-cycloundecanedicarboxylic acid into the corresponding anhydride, 4.84 g. of the trans diacid obtained above and 10 cc. of acetyl chloride are introduced into a 50 cc. spherical flask provided with a condenser and a calcium chloride tube. The mixture is boiled under reflux for 1 hour and allowed to stand overnight at a temperature of 20–22° C. then the excess of acetyl chloride and acetic acid formed is evacuated in vacuo. The product is taken up in 20 cc. of ether and filtered, and after evaporation of the ether 4.69 g. of an oil is obtained, which crystallises. On recrystallisation from petroleum ether (B.P. 35–50° C.), the anhydride of trans-cycloundecane-1,2-dicarboxylic acid is obtained in the form of fine needles which melt at 72° C.

Analysis:

|  | Calculated for $C_{13}H_{20}O_3$ | Found |
|---|---|---|
| C, percent | 69.61 | 69.52 |
| H, percent | 8.99 | 8.83 |

It is furthermore possible to separate and identify the cis and trans forms of cycloundecane-1,2-dicarboxylic acid, directly after the reaction of the alkali metal hydroxide with ethyl 1-bromo-2-oxocyclododecanecarboxylate. For this purpose, after acidification of the aqueous solution, the benzene extraction phase is omitted and the two isomeric cyclanic diacids are allowed to crystallise. They are then separated by fractional crystallisation from ether. The cis diacid (M.P. 171–172° C.) is soluble in this solvent and recrystallises on the addition of petroleum ether (B.P. 35–50° C.), while the trans diacid (M.P. 196–197° C.) remains insoluble in ether.

(d) *Action of an Alkali Metal Hydroxide in Ethanolic Medium on Ethyl 2-Oxo-3-Bromocyclododecanecarboxylate*

Exactly the same procedure is followed as described under (c) above, with the same proportions of reactants. There are obtained from 33.3 g. of ethyl 2-oxo-3-bromo-cyclododecanecarboxylate 8.92 g. of trans-cycloundecane-1,2-dicarboxylic acid which melts at 196.5° C., and 4.1 g. of the anhydride of cis-cycloundecane-1,2-dicarboxylic acid which melts at 66° C.

It is possible to subject the said diacid and the said anhydride to the same treatments as indicated under (c) in this example in order to obtain the same products.

EXAMPLE II

The procedure described under (c) in Example I is followed, but the ethanol is replaced by the same quantity of methanol and the reaction mixture is heated under reflux for 3 hours. The methanol is driven off by distillation under atmospheric pressure and replaced by water. A neutral fraction representing 400 mg. of product is removed by extraction with ether. The aqueous fraction is acidified by the addition of 2 cc. of concentrated hydrochloric acid, then the organic acid fraction is extracted with benzene. After removal of the benzene from the benzenic solution, there is recovered 23.54 g. of acid fraction, consisting of a mixture of stereoisomeric cycloundecane-1,2-dicarboxylic acids. 200 cc. of ether are then added and the mixture is boiled with stirring. A precipitate forms, which is filtered and dried, whereby there are obtained 11.50 g. of crystalline product melting at 196–197° C. and consisting of trans-cycloundecane-1,2-dicarboxylic acid, identical with that obtained under the operating conditions of Example I.

After elimination of the ether from the ethereal solution, there remains 12.47 g. of a viscous oil which, on distillation under 0.1 mm. Hg gives 8.95 g. of a middle fraction distilling at 130–131° C. and which, when recrystallised from cold ether, gives 3.375 g. of shiny crystals M.P. 65–67° C. consisting of the anhydride of cis-cycloundecane-1,2-dicarboxylic acid, identical with that obtained in Example I(c) and which can be converted in a similar manner into the cis-diacid M.P. 171–172° C. and into the trans-diacid, M.P. 196–197° C.

It is also possible to separate and identify directly the cis and trans forms of cycloundecane-1,2-dicarboxylic acid, by fractional crystallisation from a mixture of ether and petroleum ether, as described at the end of Example I(c).

EXAMPLE III

By proceeding as indicated in Example II in a methanolic medium, but using ethyl 2-oxo-3-bromocyclododecanecarboxylate, the same series of products are obtained as in Example II.

EXAMPLE IV (a) *Preparation of Ethyl 1-Chloro-2-Oxocyclododecanecarboxylate*

Into a spherical flask are introduced 25.4 g. of ethyl 2-oxocyclododecanecarboxylate and 100 cc. of carbon tetrachloride, then 2.4 litres of chlorine are passed therethrough bubble-by-bubble over one hour with stirring. The stirring is continued for a further hour at 20–22° C., then the organic layer is washed with water and dried over anhydrous calcium chloride. After distillation in vacuo of the carbon tetrachloride, there is obtained 28 g. of an oil which crystallises on cooling. On recrystallisation of the crystals from methanol, a product melting at 62–63° C. is obtained. In infra-red spectroscopy, this product does not exhibit the characteristic bands of the enolic form, as is the case with the initial beta-keto-ester. In addition, it remains colourless in the presence of ferric chloride. It may therefore be regarded as ethyl 1-chloro-2-oxo-cyclododecanecarboxylate, of which analysis gave the following results:

|  | Calculated | Found |
| --- | --- | --- |
| C, percent | 62.39 | 62.55 |
| H, percent | 8.72 | 8.85 |
| Cl, percent | 12.28 | 12.49 |

(b) *Action of an Alkali Metal Hydroxide in Methanol on Ethyl 1-Chloro-2-Oxocyclododecanecarboxylate*

There are introduced into the same apparatus as used in Example I(a) 22 g. of potassium hydroxide, 28.9 g. of ethyl 1-chloro-2-oxocyclododecanecarboxylate and 250 cc. of methanol, and the mixture is heated under reflux for 4 hours with stirring. The formation of an abundant precipitate of sodium chloride is observed. The methanol is distilled under atmospheric pressure and replaced by water, then the neutral fractions are extracted with ether, which gives after evaporation of the solvent 0.5 g. of neutral products.

The basic liquors are acidified and then extracted with benzene. After evaporation of the solvent of the benzenic solution, 23 g. of acid product are recovered which, when treated as described in Example I, give 9 g. of trans-cycloundecane-1,2-dicarboxylic acid, M.P. 196–197° C., and 11 g. of anhydride, M.P. 65–67° C., from which products it is readily possible to obtain the cis-diacid and the anhydride, M.P. 72° C., as indicated in Example I(c).

EXAMPLE V (a) *Preparation of 2-Oxocyclododecanecarboxylic Acid*

Into a 500 cc. spherical flask provided with a condenser, a supply funnel and a stirrer are introduced 5 g. of solamide and 100 cc. of anhydrous diethyl ether, then there is run in with stirring over 45 minutes a solution of 18.2 g. (0.1 mol) of cyclododecanone, in 50 cc. of anhydrous ether. The mixture is then heated under reflux for 2 hours and the ethereal sodium ketone suspension obtained is siphoned into a stirred spherical flask containing Dry Ice. The temperature falls to −50° C. and it is allowed to rise to 20–22° C. (for about 2 hours), then water is added and a neutral fraction is extracted with ether. There is thus recovered 4 g. of unreacted cyclododecanone. The aqueous fraction is cooled to 0° C., and then acidified to pH 5 by means of dilute hydrochloric acid. After extraction with ether and washing with water to pH 7, the organic layer is dried over anhydrous calcium chloride, then the ether is evaporated in the cold under reduced pressure. Petroleum ether (27–35° C. fraction) is added, and there is obtained on crystallisation 12 g. of 2-oxocyclododecanecarboxylic acid, M.P. 114° C. This acid is relatively unstable and transforms into the initial ketone. However, at room temperature, and if it is pure, the decomposition is fairly slow.

Analysis gave the following results:

|  | Calculated | Found |
| --- | --- | --- |
| C, percent | 68.99 | 69.34 |
| H, percent | 9.80 | 10.05 |

(b) *Preparation of 1-Bromo-2-Oxocyclododecanecarboxylic and 2-Oxo-3-Bromocyclododecanecarboxylic Acids*

Into a spherical flask similar to that described under (a), but having a capacity of 1000 cc., is introduced a solution of 22.6 g. (0.1 mol) of 2-oxocyclododecanecarboxylic acid in 500 cc. of anhydrous benzene. The temperature is maintained at 4° C. and, while a light current of carbon dioxide is circulated through the flask, 16 g. of bromine are run in drop-by-drop over 10 minutes. The temperature is maintained at 20–22° C. for 30 minutes, then the reaction mass is washed with water to remove the hydrobromic acid formed, the organic phase is dried over anhydrous calcium chloride, the benzene is evaporated by distillation in vacuo and there is thus obtained 29 g. of crude product which, on recrystallisation from a mixture of ether and petroleum ether (35–50° C. fraction), melts at 157° C. The infra-red spectrum of the product shows that it is 1-bromo-2-oxocyclododecanecarboxylic acid. Analysis gave the following results:

|            | Calculated | Found  |
|------------|------------|--------|
| C, percent | 51.16      | 51.15  |
| H, percent | 6.93       | 7.01   |
| Br, percent| 26.18      | 26.38  |

When the above experiment is repeated with the same proportions of reactants, but maintaining the temperature of the reaction mass at 20–22° C. for 3 days (instead of for 30 minutes), there is obtained 25 g. of product melting at 159–160° C., which is identified, from the infra-red spectrum showing strong bands characteristic of the enolic form, as 2-oxo-3-bromocyclododecanecarboxylic acid.

Analysis gave the following results:

|            | Calculated | Found  |
|------------|------------|--------|
| C, percent | 51.16      | 51.05  |
| H, percent | 6.93       | 6.82   |
| Br, percent| 26.18      | 26.12  |

The mixture of the 1-bromo and 3-bromo derivatives shows a considerable depression of the melting point. On the other hand, the ferric chloride test confirms the structure established above for the two halogenated isomers.

(c) *Action of an Alkali Metal Hydroxide in Aqueous Medium on 1-Bromo-2-Oxocyclododecanecarboxylic Acid*

Into a 250 cc. spherical flask are introduced 30.5 g. of 1-bromo-2-oxocyclododecanecarboxylic acid and 30 g. of potassium hydroxide, and the mixture is dissolved by the addition of 500 cc. of water. The temperature of the mixture is raised to 70–80° C. on the water bath and then the product is allowed to stand overnight. The reaction mixture is acidified by the addition of dilute hydrochloric acid to a pH of 5 and then rapidly extracted with ether. After removal of the solvent from the ethereal solution, there is obtained 24.5 g. of acid product which, after having been treated as described in Example I(c), gives 15 g. of cycloundecane-1,2-dicarboxylic acid, M.P. 196° C. The same products as described in Example I(c) can be obtained from this acid.

(d)

By proceeding as indicated under (c) above, but starting with 2-oxo-3-bromocyclododecanecarboxylic acid, obtained as indicated under (b), the same stereoisomeric cycloundecane-1,2-dicarboxylic acids are obtained.

EXAMPLE VI

*Action of an Alkali Metal Alcoholate on Ethyl 2-Oxo-1-Bromo-(and 3-Bromo)Cyclododecanecarboxylates*

Into a three-necked 500 cc. of spherical flask are introduced 100 cc. of anhydrous ethanol and 5 g. of sodium. After dissolution of the sodium, there are added at 20–22° C. 33.3 g. of ethyl 1-bromo-2-oxocyclododecanecarboxylate, and then the mixture is heated under reflux for 3 hours. The ethanol is evaporated and the residue is dropped into a mixture of 200 cc. of water and 15 cc. of concentrated hydrochloric acid. After extraction with ether, washing of the ethereal solution with water, drying and evaporation of the solvent, there is obtained 29.4 g. of a yellow oil which does not crystallise. This oil consists of a crude mixture of ethyl diesters of the two stereoisomeric cycloundecane-1,2-dicarboxylic acids.

15 grams of the oil obtained are extracted and saponified with 50 cc. of a 10% potassium hydroxide solution in methanol with heating under reflux for 4 hours. The methanol is evaporated and replaced by water. After cooling, 160 mg. of neutral product is obtained by extraction with ether. The aqueous fraction gives quantitatively, after acidification with 10 cc. of 10% hydrochloric acid, a mixture of the two stereoisomeric cycloundecane-1,2-dicarboxylic acids, already identified, which can be separated as described in Example I.

Identical results are obtained when starting with ethyl 2-oxo-3-bromocyclododecanecarboxylate.

We claim:

1. A compound selected from the class consisting of cis and trans-cycloundecane-1,2-dicarboxylic acids and their corresponding anhydrides.
2. Cis-cycloundecane-1,2-dicarboxylic acid.
3. Trans-cycloundecane-1,2-dicarboxylic acid.
4. The anhydride of cis-cycloundecane-1,2-dicarboxylic acid.
5. The anhydride of trans-cycloundecane-1,2-dicarboxylic acid.
6. A process for the preparation of cis- and trans-cycloundecane-1,2-dicarboxylic acids which comprises reacting a compound selected from the class consisting of alkali metal hydroxides and alkali metal alcoholates with a compound selected from the class consisting of the compounds of the formulae:

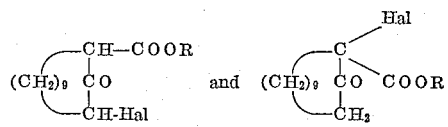

wherein R is selected from the class consisting of the hydrogen atom and alkyl radicals containing from 1 to 5 carbon atoms and Hal represents a halogen atom, and acidifying the reaction mixture to liberate the free acid product.

7. A process for the preparation of cis- and trans-cycloundecane-1,2-dicarboxylic acids which comprises reacting an alkali metal hydroxide with a compound selected from the class consisting of the compounds of the formulae:

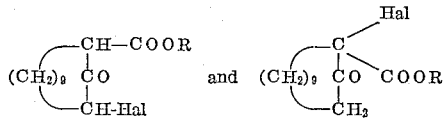

wherein R is a hydrogen atom and Hal represents a halogen atom, and acidifying the reaction mixture to liberate the free acid product, the said reaction being effected with the said hydroxide in aqueous solution.

8. A process for the preparation of cis- and trans-cycloundecane-1,2-dicarboxylic acids which comprises reacting an alkali metal hydroxide with a compound conforming to one of the formulae:

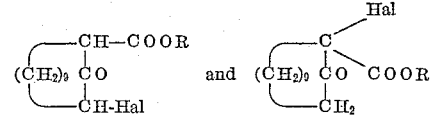

wherein R is an alkyl radical containing from 1 to 5 carbon atoms and Hal represents a halogen and acidifying the reaction mixture to liberate the free acid product, the said reaction being effected with the said hydroxide in solution in a medium selected from the class consisting of alcohols, aqueous alcohols and aqueous dioxane.

9. A process for the preparation of cis- and trans-cycloundecane-1,2-dicarboxylic acids which comprises reacting an alkali metal alcoholate with a compound conforming to one of the formulae:

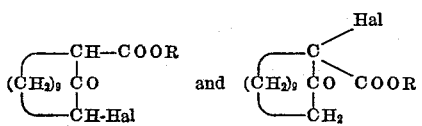

wherein R is an alkyl radical containing from 1 to 5 carbon atoms and Hal represents a halogen atom, and acidifying the reaction mixture to liberate the free acid product, the said reaction being effected with the said alcoholate in alcoholic solution followed by saponification of the resultant diester with an alcoholic solution of an alkali metal hydroxide.

References Cited in the file of this patent

Alder et al.: Annalen der Chemie, Justus Liebig's, vol. 564, pages 79–96, at pages 84–5 and 93–4 (1949).

Ayres et al.: J. Chem. Soc., London (1958), pages 1779–89.

Assony et al.: J. Amer. Chem. Soc., vol. 80 (1958), pages 5978–82.